(12) United States Patent
Jafa et al.

(10) Patent No.: US 10,854,033 B2
(45) Date of Patent: Dec. 1, 2020

(54) MOBILE VENDING MACHINE

(71) Applicant: PepsiCo, Inc., Purchase, NY (US)

(72) Inventors: Emad Jafa, Brewster, NY (US); Cheuk Chi Lau, White Plains, NY (US); Xuejun Li, White Plains, NY (US); Yong Serock, Newton, CT (US); Wai Ting Chan, Cambridge (GB); Samuel Luke Johnstone, Cambridge (GB); Martyn Thomas Mitchell, Royston (GB); Euan Morrison, Cambridge (GB); Erik David Williams, Cambridge (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/146,994

(22) Filed: Sep. 28, 2018

(65) Prior Publication Data

US 2020/0105085 A1   Apr. 2, 2020

(51) Int. Cl.
| | |
|---|---|
| *G07F 11/02* | (2006.01) |
| *G05D 1/00* | (2006.01) |
| *G06Q 30/06* | (2012.01) |
| *G08G 1/00* | (2006.01) |
| *G06Q 20/32* | (2012.01) |

(52) U.S. Cl.
CPC ........... *G07F 11/02* (2013.01); *G05D 1/0088* (2013.01); *G06Q 20/3224* (2013.01); *G06Q 30/0641* (2013.01); *G08G 1/202* (2013.01); *G05D 2201/02* (2013.01)

(58) Field of Classification Search
CPC .... G07F 11/02; G08G 1/202; G06Q 20/3224; G06Q 30/0641; G05D 1/0088; G05D 2201/02

USPC .................................................. 700/231–244
See application file for complete search history.

(56) References Cited

U.S. PATENT DOCUMENTS

| | | | | |
|---|---|---|---|---|
| 9,406,187 | B2 | 8/2016 | Hammonds et al. | |
| 9,741,010 | B1 | 8/2017 | Heinla | |
| 10,248,122 | B2 * | 4/2019 | Cronin | G05D 1/0282 |
| 10,275,975 | B2 * | 4/2019 | High | G01C 21/3605 |
| 2004/0019406 | A1 * | 1/2004 | Wang | B25J 5/007 |
| | | | | 700/231 |
| 2010/0100241 | A1 * | 4/2010 | Jarisch | B25J 11/00 |
| | | | | 700/259 |
| 2013/0027227 | A1 * | 1/2013 | Nordstrom | G01C 21/3438 |
| | | | | 340/990 |
| 2016/0098882 | A1 * | 4/2016 | Holdych | G06Q 20/18 |
| | | | | 700/237 |
| 2017/0011580 | A1 * | 1/2017 | Huang | G06Q 10/30 |

(Continued)

*Primary Examiner* — Michael Collins
(74) *Attorney, Agent, or Firm* — Sterne, Kessler, Goldstein & Fox, P.L.L.C.

(57) ABSTRACT

Mobile vending machines for storing and dispensing products to consumers at various locations. A mobile vending machine may include a product storage system, a user interface, a powertrain system, and a control unit. A consumer may view a list of products in the mobile vending machine using a mobile device, such as a smart phone. The consumer may summon the mobile vending machine to a location using the mobile device, and the mobile vending machine may automatically complete a transaction with the consumer, where the consumer receives a product from the mobile vending machine. The control unit may enable the mobile vending machine to autonomously travel to the location of the consumer.

20 Claims, 9 Drawing Sheets

(56) References Cited

U.S. PATENT DOCUMENTS

2017/0255921 A1* 9/2017 Zhang .................. G06Q 20/123
2018/0053369 A1* 2/2018 High .................. G01C 21/3605

* cited by examiner

MOBILE VENDING MACHINE

FIELD

The described embodiments generally relate to mobile product dispensers, such as mobile vending machines. In particular, embodiments relate to autonomous mobile vending machines that may be summoned to a location by a user to complete a transaction with the user.

BACKGROUND

Vending machines enable consumers to purchase a variety of products, such as foods, beverages, or other consumable goods on demand. As an alternative to some retail environments offering similar products for sale (such as, for example, convenience stores or kiosks), vending machines have a number of advantages. For example, some vending machines do not require the presence of an employee to complete a transaction, thereby lowering operating costs and making the machines an inexpensive means for selling goods to consumers. Further, some vending machines allow for quick and efficient transactions, enhancing a consumer's purchasing experience.

BRIEF SUMMARY OF THE INVENTION

Some embodiments provide mobile vending machines that can operate autonomously and can navigate to users to vend products. They allow a user to conveniently summon the mobile vending machine to the location of the user or another predetermined location using a mobile device, such as a smart phone, and purchase and receive a product from the mobile vending machine. Methods of vending a product from a mobile vending machine are also described herein.

For example, a method of vending a product from a mobile vending machine may include sending to a user mobile device a list of products contained in the mobile vending machine. The list may then be displayed on the user mobile device, where a user may select a product. The method may also include receiving from the user mobile device the product selection, as well as location information such as the location of the user, or a location where the user would like to meet the vending machine. Then, based on the received user information, the mobile vending machine may automatically maneuver to meet the user at the desired location. Then, after arriving at the location of the user, a transaction may be performed with the user related to the product.

A method of vending a product from a mobile vending machine may include receiving at a user mobile device a list of products contained in the mobile vending machine. Then a location of a user may be transmitted to the mobile vending machine. The mobile vending machine may be configured to then automatically navigate to the location of the user. Then, after arriving at the location of the user, a transaction may be performed with the user where the user receives a product from the mobile vending machine.

Embodiments include autonomous mobile vending machines, where the mobile vending machines include a product storage system for storing products, a user interface for displaying information, a transceiver, a dispensing opening, and a control unit. The transceiver is configured to send and receive information. The information that may be sent may include a list of products stored in the product storage system. The information that may be received may include a product selection from a user. The dispensing opening may be coupled to the product compartment, and a user may access the dispensing opening to receive a vended product. The control unit may automatically control the movement of the vending machine, and may limit the operation of the vending machine to within a predetermined geographic area.

Embodiments may also include autonomous mobile vending machines, where the mobile vending machines include a product compartment for storing products, a transceiver, a dispensing opening, and a control unit. The transceiver is configured to send and receive information. The information that may be received may include a product selection from a user mobile device. The dispensing opening may be coupled to the product compartment, and a user may access the dispensing opening to receive a vended product. The control unit may automatically control the movement of the mobile vending machine, and may move the mobile vending machine to the location of the user automatically during a vending operation.

BRIEF DESCRIPTION OF THE FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The consumer appeal and profitability of some vending machines may be significantly correlated with the vending machine's ability to serve consumers in a convenient and efficient manner. One measure of a vending machine's convenience may be the location of the vending machine relative to areas of convenience for consumers, such as high-traffic areas. Due to certain size and/or infrastructure requirements, however, some vending machines may be limited to placement in areas that are not in high-traffic areas, thus requiring consumers to travel out of their way to purchase goods from the vending machine. Further, some vending machines that are stationary, by nature, may only serve consumers in one location, which may limit the consumer appeal as well as the profitability of the vending machine.

Some embodiments as described herein provide a mobile vending machine configured to conveniently serve consumers in multiple locations. Such mobile vending machines may be configured to allow a user to summon the mobile vending machine to the location of the user using an application on a mobile device. The mobile vending machine may include a control unit configured to move the mobile vending machine to the location of the user autonomously. In this manner, some embodiments may provide convenience to consumers by allowing the consumer to remain stationary while the mobile vending machine travels to a location to meet the consumer.

Some embodiments may provide a mobile vending machine capable of servicing multiple areas of high consumer traffic, thus increasing the profitability of the mobile vending machine. For example, mobile vending machines as described herein may determine the time and location where consumers are likely to purchase products, and then automatically navigate to those locations to advertise and vend products to consumers. Further, since these vending machines are mobile, they may serve consumers in high-traffic areas without requiring space or infrastructure in the high-traffic area to be dedicated solely to the vending machine.

Figure 1:
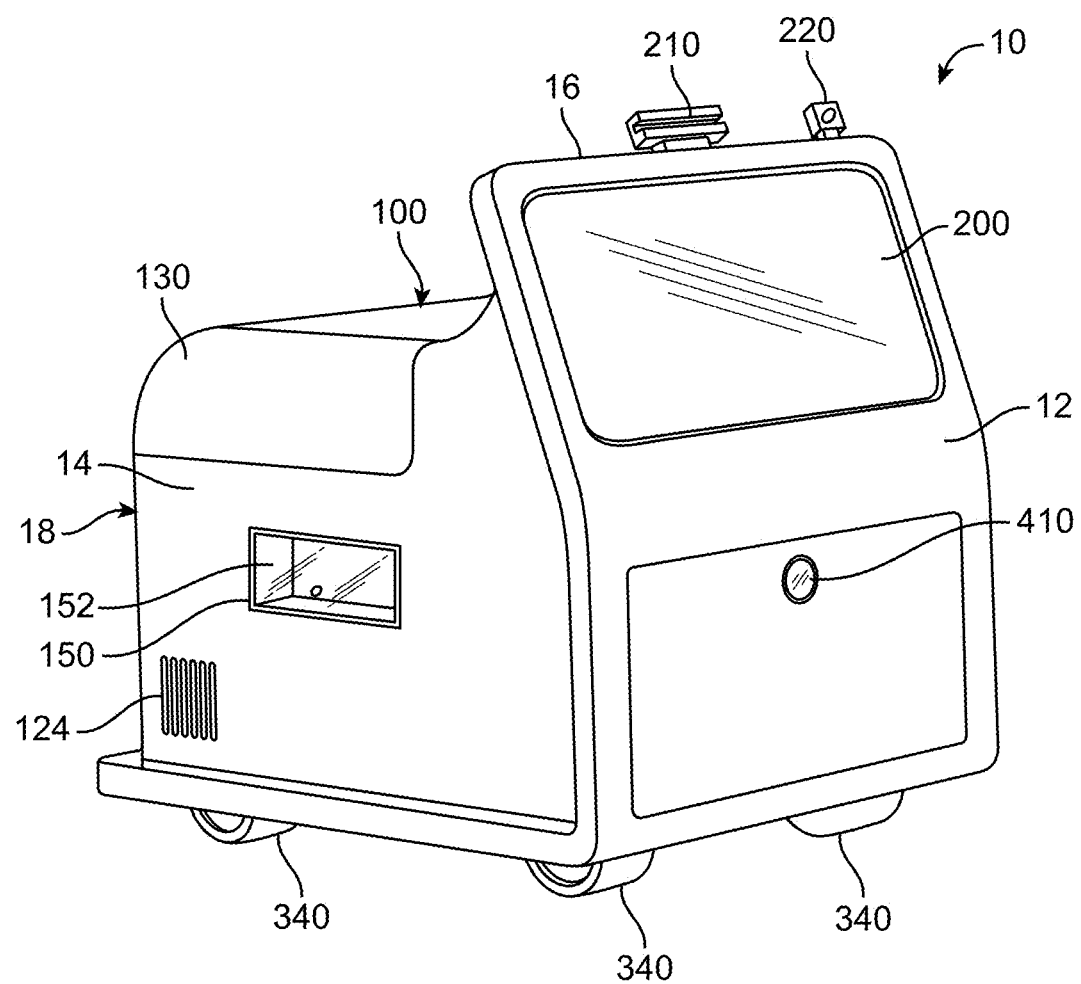
FIG. 1 is a perspective view of a mobile vending machine according to some embodiments.
Figure 2:
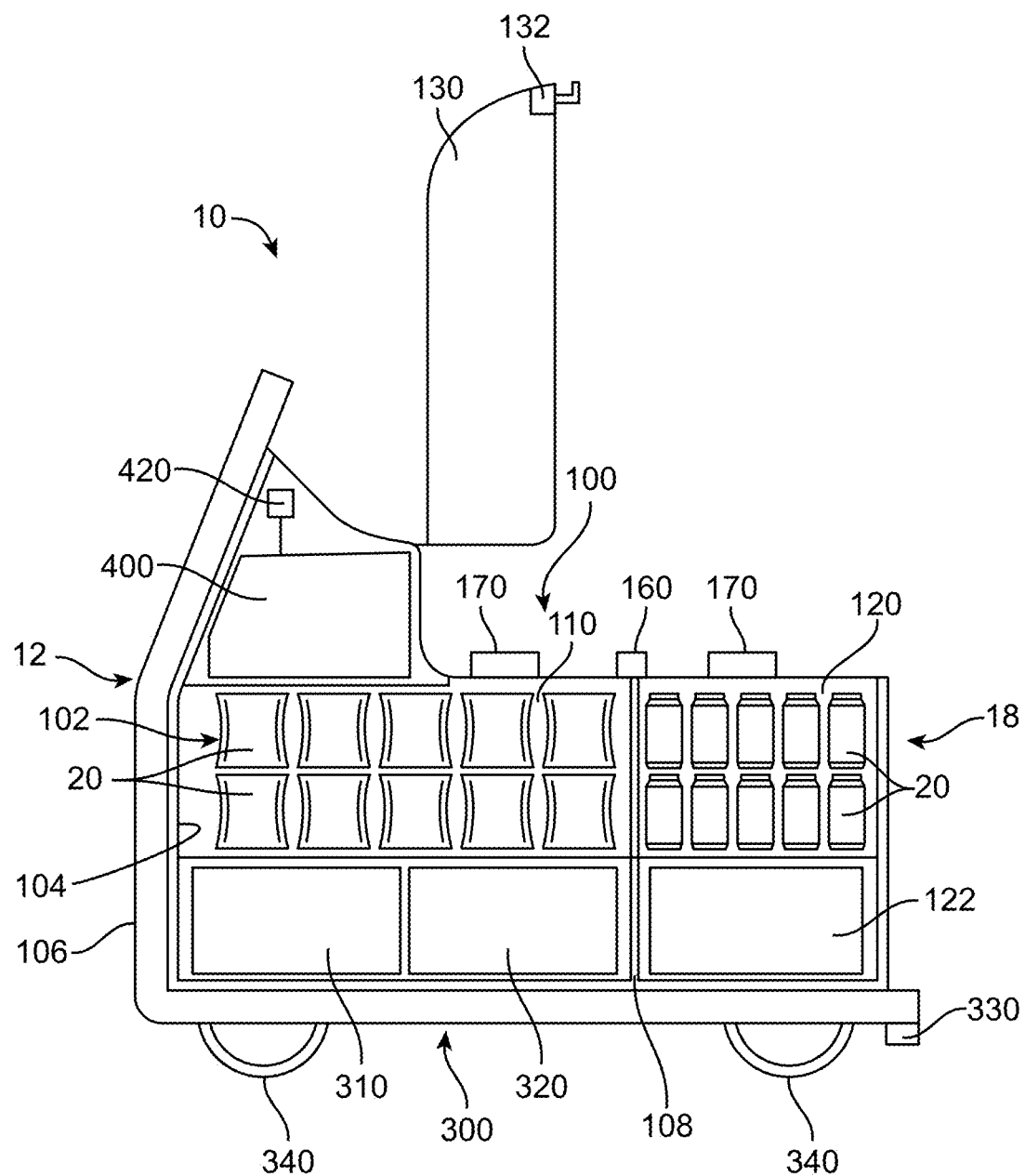
FIG. 2 is a partial sectional view of a mobile vending machine according to some embodiments.

Embodiments will now be described in more detail with reference to the figures. With reference to FIGS. 1 and 2, a mobile vending machine 10 may include a product storage system 100, a user interface 200, a powertrain system 300, and a control unit 400.

Product storage system 100 is configured to store, display, and/or dispense one or more products 20 to be vended to a user. Products 20 may include perishable and non-perishable products. Products 20 may include, but are not limited to, chips, candy bars, soft drinks, water, carbonated water, juices, alcoholic beverages, sports drinks, pre-made packaged goods, fresh food items, or other suitable products. In some embodiments, products 20 may include convenience items, medicine, toiletries, electronic devices, or other suitable non-perishable products.

Product storage system 100 may include an interior space 102 defined by an interior surface 104. In some embodiments, product storage system 100 may include one or more product compartments configured to store products 20. As shown in FIG. 2, for example, product storage system 100 may include a first product compartment 110 and a second product compartment 120 disposed adjacent to, but separate from, first product compartment 110. A wall 108 may be disposed between first product compartment 110 and second product compartment 120. In some embodiments, wall 108 may be insulated to reduce the exchange of heat between first product compartment 110 and second product compartment 120. In some embodiments, first product compartment 110 may store different kinds of products 20 than second product compartment 120. For example, non-perishable products 20 may be stored in first product compartment 110, and perishable products 20 may be stored in second product compartment 120. In some embodiments, products 20 that are preferably served at a temperature other than room temperature may be stored in second product compartment 120, and products 20 that are preferably served at room temperature may be stored in first product compartment 110. In some embodiments, all of the products 20 stored in first and second product compartments 110, 120, respectively, may be of the same type, weight, volume, and/or cost.

In some embodiments, at least a portion of the product storage system 100 is transparent such that a user may see into one or both of first and second product compartments 110, 120.

A temperature control system 122 may be used to control the temperature of one or both of product compartments 110, 120 by, for example, removing or adding heat to product compartments 110, 120. In some embodiments, second product compartment 120 is temperature controlled, and first product compartment 110 is not temperature controlled. In some embodiments, both first and second product compartments 110, 120 are temperature controlled. In some embodiments, neither first or second product compartments 110, 120 are temperature controlled.

Temperature control system 122 may be, for example, a thermoelectric cooler, a refrigeration system, or other powered cooling system. In some embodiments, temperature control system 122 may be a passive cooling system such as, for example, ice, an ice pack, cool pack, or other thermal capacitor capable of absorbing considerable amounts of heat. Temperature control system 122 may be a thermoelectric heater, heat pump, or other powered heating system. In some embodiments, temperature control system 122 may be a passive heating system such as, for example, a heat pack, chemical heat pack, or other thermal capacitor capable of releasing considerable amounts of heat. In some embodiments, product storage system 100, or a portion of product storage system 100, may include a thermally insulating material to reduce the exchange of heat between interior space 102 and the ambient conditions surrounding mobile vending machine 10. In some embodiments, a layer of air may be sealed between an exterior surface 106 and the interior surface 104 to act as a thermal insulator. In some embodiments, a vent 124 may be disposed in a side 14 of mobile vending machine 10 whereby heat from first and/or second product compartments 110, 120 may be expelled to the environment or absorbed from the environment by temperature control system 122.

Product storage system 100 may include a dispensing opening 150 that is accessible by a user to receive a vended product 20. In some embodiments, dispensing opening 150 may be disposed in a side 14 of mobile vending machine 10. In some embodiments, dispensing opening 150 may be disposed on a top 16, front 12, or rear 18 of mobile vending machine 10. In some embodiments, dispensing opening 150 may include a dispensing opening door 152 configured to cover dispensing opening 150 when in a closed position.

Products 20 that are stored in product storage system 100 may be arranged into rows, columns, and/or stacks within product compartments 110, 120. In some embodiments, product storage system 100 may include one or more dispensing components 170 for moving products 20 from product compartments 110, 120 to dispensing opening 150 during a vending operation. In some embodiments, dispensing components 170 may be, for example, a coil that displaces products 20 when rotated, a conveyer system that linearly displaces products 20, a hydraulic, pneumatic, or electrical actuator that pushes or pulls products 20, or a robotic implement configured to lift, hold, and/or transport products 20. In some embodiments, one or more shoots, slides, or passageways may be used to move products 20 from product compartments 110, 120 to dispensing opening 150 using the force of gravity.

Product storage system 100 may include a product storage door 130 whereby a user may access first and/or second product compartments 110, 120. In some embodiments, product storage door 130 may be disposed on the top 16 of mobile vending machine 10. Product storage door 130 may be opened such that first and second product compartments 110, 120 may be filled or refilled with products 20 to be vended. In some embodiments, product storage door 130 may include a lock 132 and may be locked such that only authorized users may access first and/or second product compartments 110, 120. As described in further detail below, in some embodiments, product storage door 130 may be selectively accessible by a user during a vending operation. In some embodiments, product storage system 100 may include a drawer which may be automatically or manually extended when product storage door 130 is in an open position.

Product storage system 100 may include one or more product removal sensors 160 configured to determine the types and quantities of products 20 that are removed from first and/or second product compartments 110, 120 during a vending operation. In some embodiments, product removal sensor 160 may be a radio-frequency identification ("RFID") reader and each product 20 in product compartment 110, 120 may include an RFID tag containing information about the respective product 20, which may be read by product removal sensor 160 when products 20 are removed. Similarly, product removal sensor 160 may include another automatic identification and data capture ("AIDC") system such as, for example, bar codes or image sensors that are configured to determine the types and quantities of products 20 removed from product compartments 110, 120 during a vending operation. In some embodiments, product removal sensor 160 may measure the weight of products 20 stored in product compartments 110, 120 and use a measured change in weight of the products 20 to determine the types and quantities of products 20 that were removed. In some embodiments, product removal sensor 160 may include sensors configured to detect the presence or absence of products 20 in product compartments 110, 120. For example, in some embodiments, product removal sensor 160 may include ultrasonic sensors respectively disposed in proximity to respective products 20 stored in product compartments 110, 120. When a product 20 is disposed in proximity to an ultrasonic sensor, the sensor may sense the presence of the product 20. When a product 20 is moved away from the ultrasonic sensor, the sensor may sense the absence of the product 20. During a vending operation, product removal sensor 160 may use a measured change in the number of products 20 in product compartments 110, 120 to determine the types and quantities of products 20 that were removed. Similarly, in some embodiments, product removal sensor 160 may include infrared light gates, which may include an infrared source and an infrared sensor. When a product 20 is disposed between the infrared source and the infrared sensor, the infrared light from the source may not reach the infrared sensor, indicating that the product 20 is present. When a product 20 is removed from between the infrared source and the infrared sensor, the infrared light from the source may reach the infrared sensor, indicating that the product 20 is absent. During a vending operation, product removal sensor 160 may use a measured change in the number of products 20 in product compartments 110, 120 to determine the types and quantities of products 20 that were removed.

In some embodiments, user interface 200 comprises a touch screen display for receiving user input and communicating information to the user. In some embodiments, user interface 200 may include electromechanical buttons for receiving input from a user. In some embodiments, user interface 200 may include a visual display for communicating with or displaying information to a user. In some embodiments, user interface 200 may include a combination of touch screens, electromechanical buttons, and/or visual displays. User interface 200 may display information about products 20 in product storage system 100. User interface 200 may include a payment system 210 for accepting payment from a user (e.g., a bill validator, coin slot, or credit card reader). In some embodiments, payment system 210 may be configured to accept payment using a digital wallet service and/or a mobile payment service.

In some embodiments, user interface 200 may include one or more readers or scanners 220 for reading a machine readable item for identifying a customer. Machine readable items may include, but are not limited to, a barcode, a magnetic strip, a quick response (QR) code, a radio frequency identification (RFID) tag, a Bluetooth-enabled device (e.g., a cell phone), a Bluetooth Low Energy (BLE) device, or an ultrasound communication device, (e.g., a device having LISNR® ultrasound technology). In some embodiments, scanner 220 may be configured for identifying one or more biometric characteristics of a customer. Scanner 220 may include, for example but not limited to, a fingerprint reader, a finger vein scanner, a retinal scanner, an iris scanner, a camera (for taking a photo and/or recording a video), or a microphone. The biometric characteristic(s) of a customer may include a fingerprint, a finger vein pattern, a retinal profile, an iris profile, a face profile, and a voice profile.

Powertrain system 300 may include a propulsion system 310 and a power storage system 320. Propulsion system 310 may include, for example, an electric motor, an internal combustion engine, or a hybrid design including components of both an electric motor and combustion engine. Power storage system 320 may include, for example, one or more batteries, rechargeable batteries, or fuel tanks to store energy to power propulsion system 310 and/or other elements of mobile vending machine 10. Powertrain system 300 may include one or more wheels 340 that receive power from propulsion system 310 in order to move and steer mobile vending machine 10. Wheels 340 may be configured for indoor, outdoor, and/or off-road travel. In some embodiments, vent 124 may allow exhaust or heat from powertrain system 300 to escape from mobile vending machine 10 to the environment. Powertrain system 300 may be configured to provide autonomous mobility for mobile vending machine 10.

Control unit 400 may be configured to enable the mobile vending machine 10 to operate autonomously, which is to say without direct human intervention. In some embodiments, control unit 400 may control all aspects of mobile vending machine 10. In some embodiments, control unit 400 may include an environmental sensor 410 configured to gather information about the environment surrounding mobile vending machine 10. Environmental sensor 410 may include one or more sensors including, for example, an image sensor, a camera, infrared sensor, ultrasonic sensor, radar, and/or light detection and ranging ("LIDAR") sensor. Environmental sensor 410 may include sensors to determine, for example, the location, speed and/or trajectory of mobile vending machine 10. In this manner, environmental sensor 410 may comprise a navigation sensor and may include, for example, a global positioning system ("GPS"), wheel speed sensors, or accelerometers. Control unit 400 may receive information from environmental sensor 410 and use the information to automatically move mobile vending machine 10 through the environment and/or to a destination. Control unit 400 may send instructions to powertrain system 300 in order to control the movement of mobile vending machine 10. Although FIG. 1 shows a single environmental sensor 410 disposed on the front 12 of mobile vending machine 10, mobile vending machine may include multiple environmental sensors 410 disposed on any portion of mobile vending machine 10.

In some embodiments, control unit 400 may be configured to allow mobile vending machine 10 to move and operate only within a predetermined geographic area such as, for example, a campus, building interior, sports complex, theatre, stadium, concert venue, festival venue, other event venue, hotel, school, a particular floor or area of a building, or other suitable geographic area. In some embodiments, an operator may be able to continuously or intermittently control certain or all functions of mobile vending machine 10 from a remote location. In some embodiments, mobile vending machine 10 may be configured to travel between floors of a building.

In some embodiments, mobile vending machine 10 may be configured to operate only indoors. In some embodiments, mobile vending machine 10 may be configured to operate only outdoors. In some embodiments, mobile vending machine 10 may be configured to operate indoors and outdoors. In some embodiments, mobile vending machine 10, or portions of mobile vending machine 10 may be resistant and/or sealed against environmental conditions such as, for example, rain, snow, dirt, heat, and/or cold.

Figure 3:
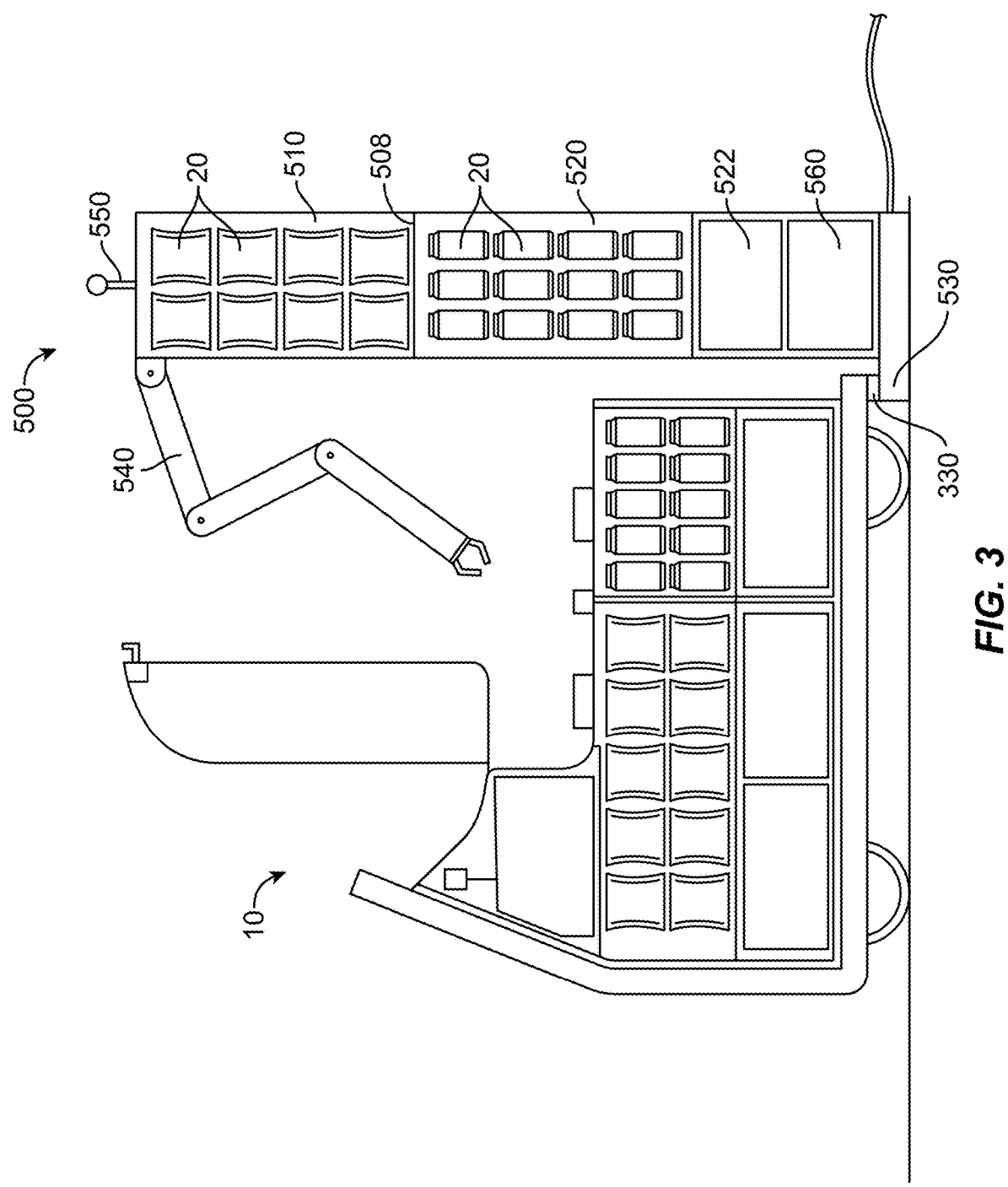
FIG. 3 is a partial sectional view of a mobile vending machine and a docking station according to some embodiments.

With reference to FIG. 3, a docking station 500 may be configured to receive mobile vending machines 10 as described herein. In some embodiments, mobile vending machine 10 may include a docking connector 330. Docking connector 330 may be configured to automatically connect to a docking port 530 disposed on docking station 500. In embodiments, docking connector 330 may comprise a power cord or a fuel line. When docking connector 330 is connected to docking port 530, for example, mobile vending machine 10 may receive power or fuel from docking station 500 in order to replenish power storage system 320. In some embodiments, docking station 500 may be connected to grid electricity, and may transform the electricity in order to recharge batteries in mobile vending machine 10. In some embodiments, vent 124 may allow gases or heat to escape from mobile vending machine 10 to the environment during a recharging process.

In some embodiments, docking station 500 may include one or more product compartments configured to store products 20. As shown in FIG. 3, for example, docking station 500 may include a first storage compartment 510 and a second storage compartment 520. In some embodiments, first storage compartment 510 may store different kinds of products 20 than second storage compartment 520. For example, non-perishable products 20 may be stored in first storage compartment 510, and perishable products 20 may be stored in second storage compartment 520. In some embodiments, products 20 that are preferably served at a temperature other than room temperature may be stored in second storage compartment 520, and products 20 that are preferably served at room temperature may be stored in first storage compartment 510. A wall 508 may be disposed between first storage compartment 510 and second storage compartment 520. In some embodiments, wall 508 may be insulated to reduce the exchange of heat between first storage compartment 510 and second storage compartment 520.

A temperature control system 522 may be used to control the temperature of one or both of storage compartments 510, 520 by, for example, removing or adding heat to storage compartments 510, 520. In some embodiments, second storage compartment 520 is temperature controlled, and first storage compartment 510 is not temperature controlled. In some embodiments, both first and second storage compartments 510, 520 are temperature controlled. In some embodiments, neither first or second storage compartments 510, 520 are temperature controlled.

Temperature control system 522 may be, for example, a thermoelectric cooler, a refrigeration system, or other powered or passive cooling system. Temperature control system 522 may be a thermoelectric heater, heat pump, or other powered or passive heating system. In some embodiments, docking station 500, or a portion of docking station 500, may include a thermally insulating material to reduce the exchange of heat between one or both of product storage compartments 510, 520 and the ambient conditions surrounding docking station 500.

In some embodiments, docking station 500 may be configured to fill or refill product storage system 100 with products 20 from storage compartments 510, 520. Similarly, docking station 500 may be configured to remove products 20 from product storage system 100. Docking station 500 may include a robotic implement 540 for adding or removing products 20 to or from product storage system 100 during a reloading operation. Robotic implement 540 may be, for example, a robotic arm or another means for adding products 20 to or removing products 20 from product storage system 100. In some embodiments, the product loading or unloading operation may be automatic, which is to say without human assistance. Docking station 500 may include a docking control unit 560 that controls robotic implement 540 and/or other functions of docking station 500. In some embodiments, mobile vending machine 10 may communicate with control unit 560 and may, for example, instruct control unit 560 to load certain types and quantities of products 20 into product storage system 100. In some embodiments, control unit 560 may determine the types and quantities of products 20 to load into product storage system 100.

In some embodiments, control unit 400 may be configured to allow mobile vending machine to move and operate only within a certain radius of docking station 500.

In some embodiments, docking station 500 may be a mobile platform, such as a truck, van, or service vehicle.

Figure 4:
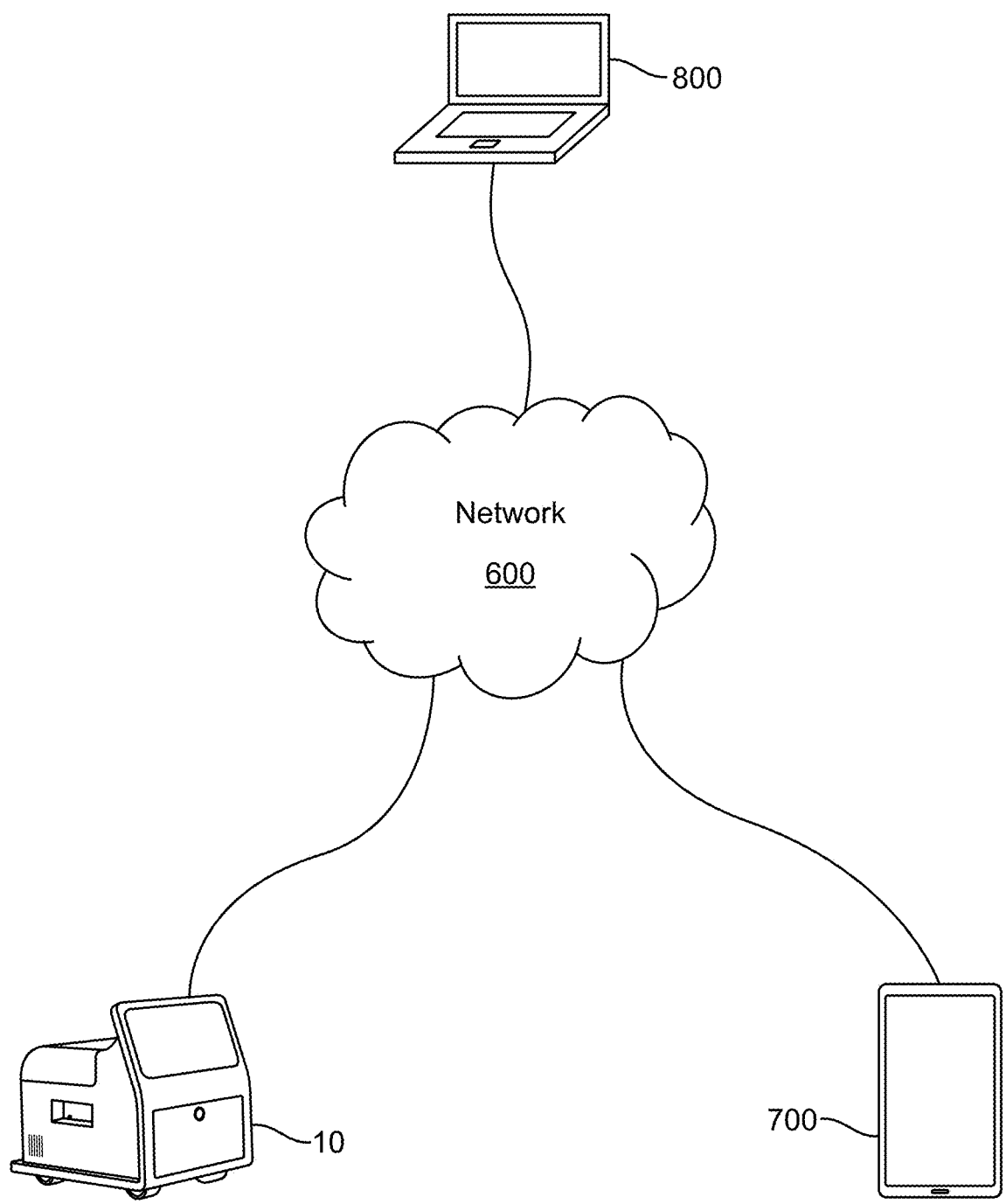
FIG. 4 depicts an exemplary network environment suitable for use and interconnection of exemplary components described herein, according to some embodiments.

With references to FIGS. 2 and 4, control unit 400 may include a transceiver 420 that is configured to send and receive information wirelessly. Transceiver 420 may allow control unit 400 to connect to a network 600, which may include, for example, a Wireless Local Area Network ("WLAN"), Campus Area Network ("CAN"), Metropolitan Area Network ("MAN"), or Wide Area Network ("WAN"). Transceiver 420 may be configured to operate on a variety of frequencies, such as Very High Frequency or Ultra High Frequency ranges, and may be compatible with specific network standards such as cell phone, WIFI™, or BLUETOOTH® wireless networks, for example.

Figure 5:
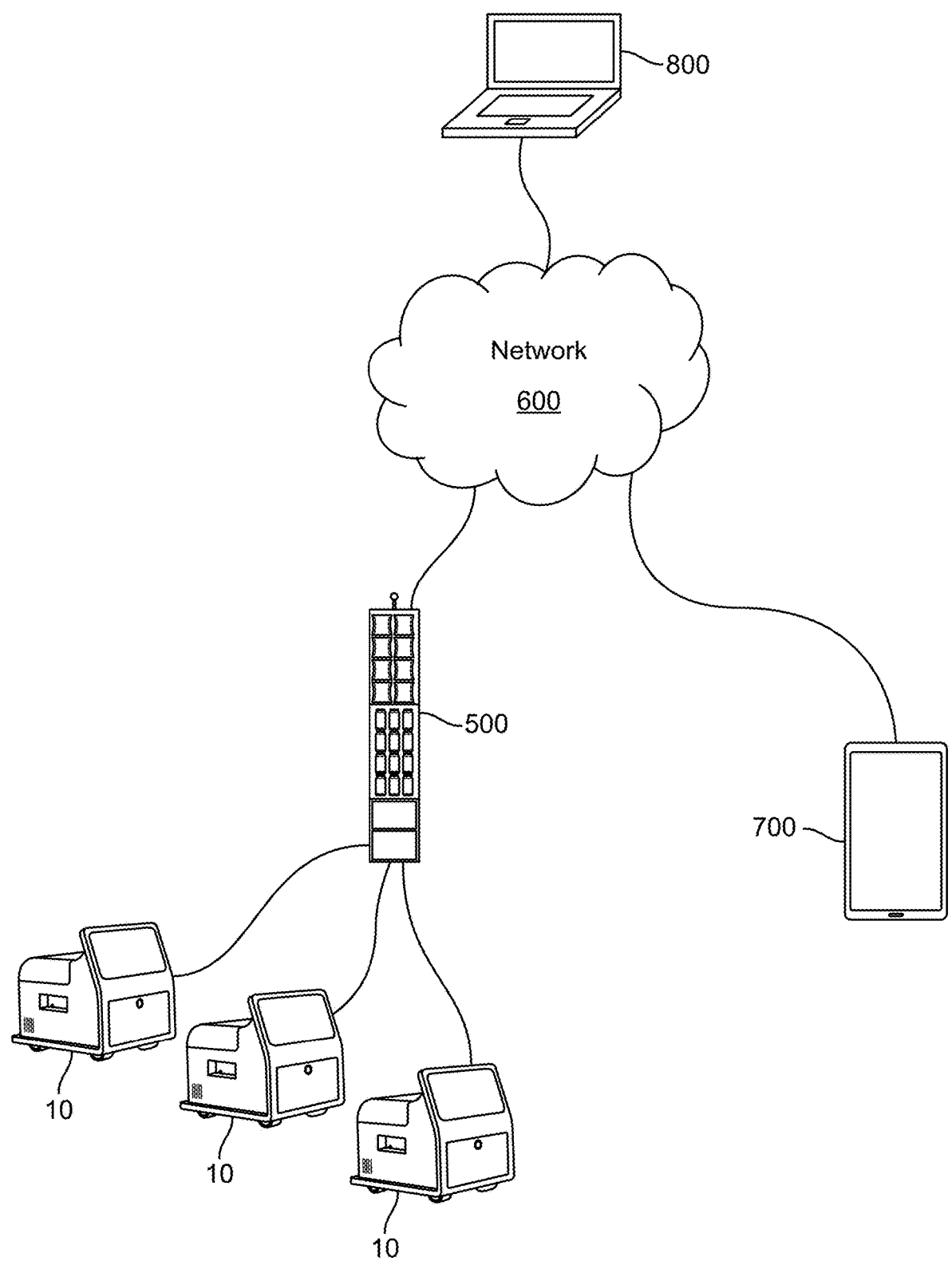
FIG. 5 depicts an exemplary network environment suitable for use and interconnection of exemplary components described herein, according to some embodiments.

With reference to FIGS. 3 and 5, docking station 500 may include a transceiver 550 that is configured to send and receive information wirelessly. Transceiver 550 may allow docking control unit 560 to connect to network 600 and/or to mobile vending machine 10. Transceiver 420 may be configured to operate on a variety of frequencies, such as Very High Frequency or Ultra High Frequency ranges, and may be compatible with specific network standards such as cell phone, WIFI™, or BLUETOOTH® wireless networks, for example. In some embodiments, docking station 500 may connect to network 600 through a wired connection.

As exemplified in FIGS. 4 and 5, mobile vending machine 10 may communicate with a user mobile device 700 over network 600. User mobile device 700 may be, for example, a cell phone, smart phone, tablet, laptop, personal computer, or other computing device capable of connecting to network 600 through a wired or wireless connection. User mobile device 700 may include a GPS or another means of determining the location of the user mobile device 700. In some embodiments, user mobile device 700 may connect directly to mobile vending machine 10. In some embodiments, an administrator device 800 may also be connected to network 600, and may be used to monitor and/or send information between user mobile device 700 and mobile vending machine 10. Administrator device 800 may be configured to manage user accounts, vending machine inventory, as well as to process transactions. Mobile vending machine 10 and/or docking station 500 may notify administrator device 800 when product inventory is low and may need to be refilled. Administrator device 800 may be able to connect to control unit 400 and control mobile vending machine 10 remotely. As exemplified in FIG. 5, more than one mobile vending machines 10 may be wirelessly connected to docking station 500. In some embodiments, docking station 500 may be placed on a campus, venue, or within a building and act as a hub for a mobile vending machine 10 or a number of mobile vending machines 10 that are servicing the campus, venue, or building.

Administrator device 800 may be configured to authenticate a customer based on the machine readable item or the biometric characteristic(s) identified by scanner 220. After authenticating a customer, administrator device 800 may associate the authenticated customer with a customer account. In some embodiments, administrator device 800 may locate a particular customer account in a database based on the machine readable item identified by scanner 220. In some embodiments, administrator device 800 may locate a particular customer account in a database based on the biometric characteristic(s) identified by scanner 220. Administrator device 800 may locate a particular customer account by comparing identified biometric characteristic(s) of a customer against a database of authorized biometric characteristics.

Figure 7:
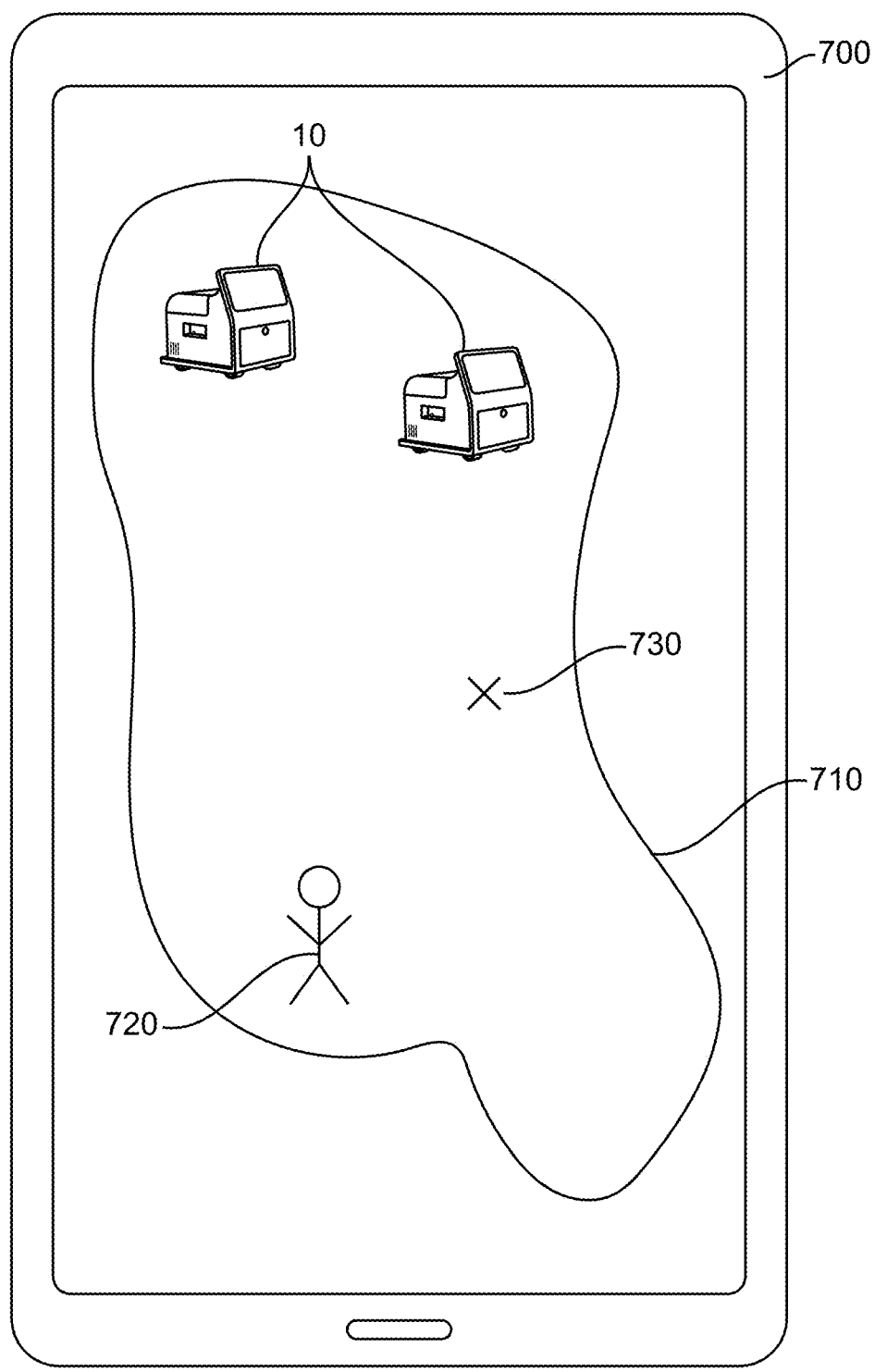
FIG. 7 is a schematic diagram of a user mobile device display according to some embodiments.
Figure 8:
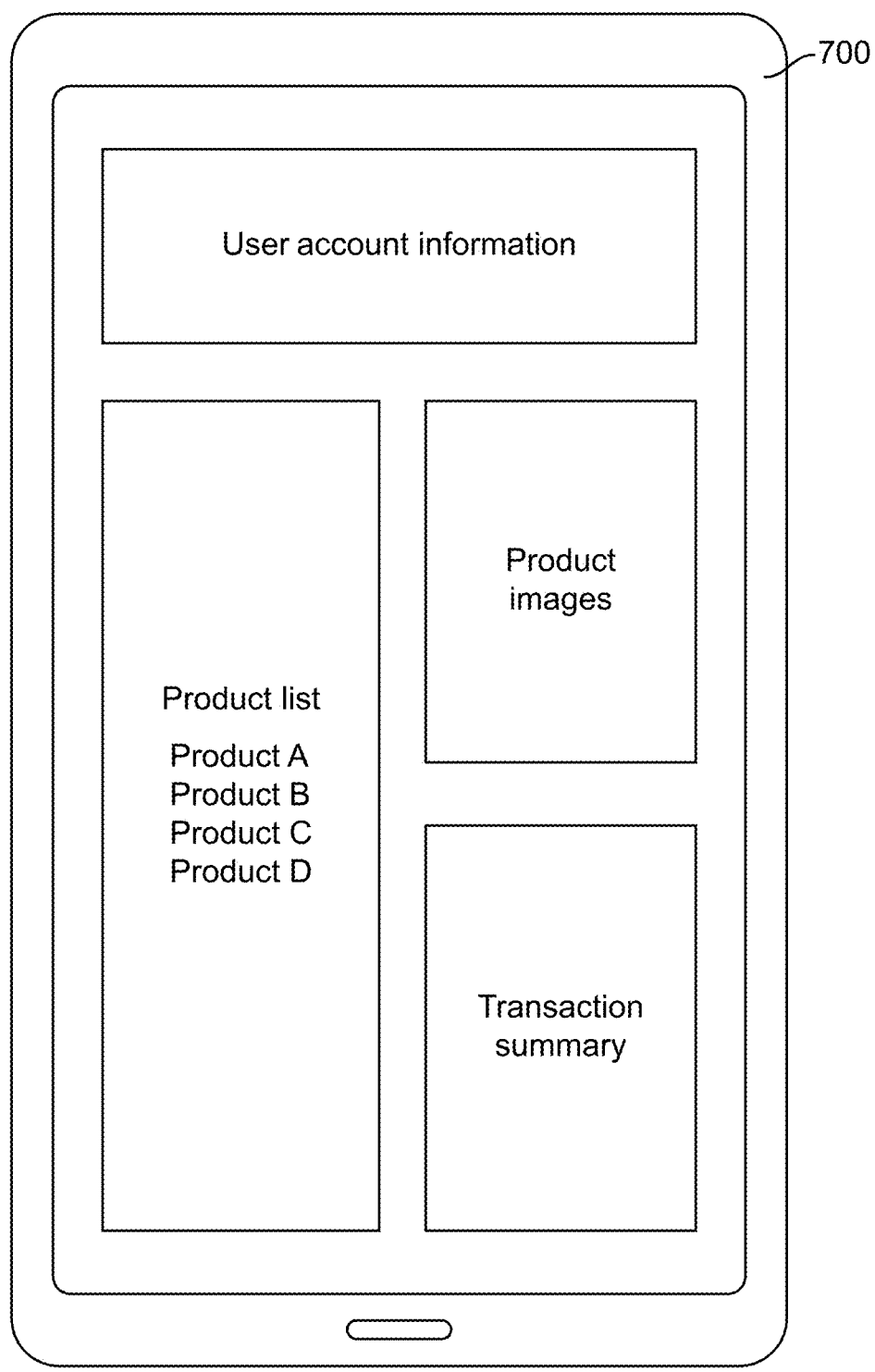
FIG. 8 is a schematic diagram of a user mobile device display according to some embodiments.

As exemplified in FIGS. 7 and 8, user mobile device 700 may include an application configured to receive information from and send information to mobile vending machine 10. In some embodiments, for example, user mobile device 700 may display a map that may show the location of one or more mobile vending machines 10 and the geographic boundary 710 of the predetermined geographic area in which the mobile vending machine(s) 10 are configured to operate. User mobile device may also be configured to display the location of the user 720, and/or a separate location 730 at which the user may meet a mobile vending machine 10. In some embodiments, user mobile device 700 may be configured to display information such as, for example, user account information, a list of products available for purchase and their prices, images of products available for purchase, and/or a summary of the transaction.

Control unit 400, docking control unit 560, and/or administrator device 800 may include memory for storing information about mobile vending machine 10, docking station 500 and/or user mobile device 700. This information may include, for example, product information, mobile vending machine location information, user location information, transaction locations, transaction times, and/or other information.

In some embodiments, one or more of control unit 400, docking control unit 560, and/or administrator device 800 may maintain a list of products 20 available for sale in mobile vending machine 10. The list may be manually or automatically updated, for example, after mobile vending machine 10 has been loaded or reloaded with products 20, or after a product 20 has been vended to a user.

Figure 6:
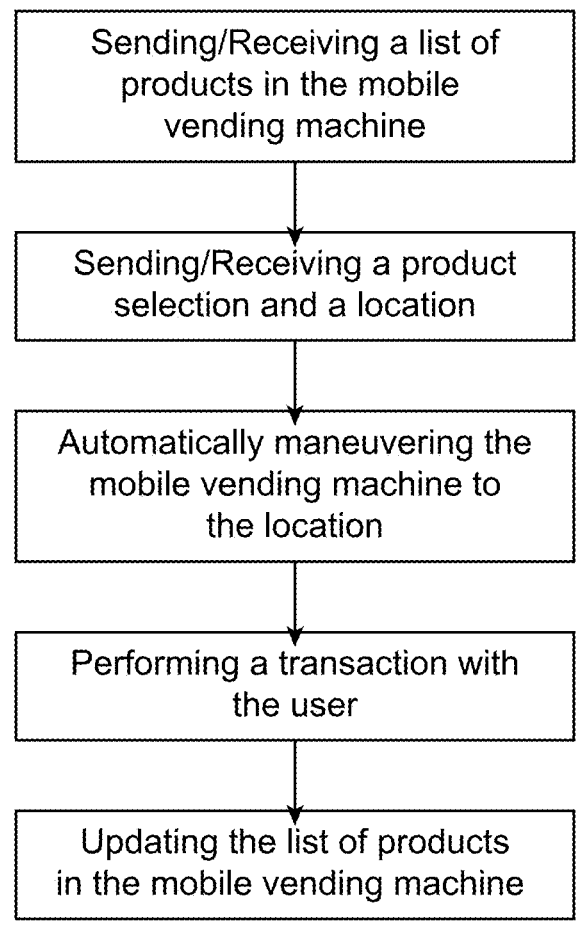
FIG. 6 is a block diagram showing the steps of a method of using the mobile vending machine according to some embodiments.

As exemplified in FIG. 6, a vending operation may include sending and receiving a list of products 20 in mobile vending machine 10, sending and receiving a product selection and a location, automatically maneuvering the mobile vending machine 10 to the location, performing a transaction with the user, and updating the list of products 20 in mobile vending machine 10.

During a vending operation according to some embodiments, mobile vending machine 10 may be summoned by a user to a location using user mobile device 700. User mobile device 700 may automatically determine the location of the user, or may ask the user to provide location information, which may include the current location of the user or another location where the user would like to meet mobile vending machine 10. After receiving the user location information, mobile vending machine 10 may automatically maneuver to the location of the user. After mobile vending machine 10 has arrived at the location of the user, the user may use user interface 200 to select and provide payment for a product 20. Then, the user may receive selected product 20 from mobile vending machine 10.

During a vending operation according to some embodiments, user mobile device 700 may receive a list of products 20 contained in mobile vending machine 10. Then, mobile vending machine 10 may be summoned by a user to a location using user mobile device 700. User mobile device 700 may automatically determine the location of the user, or may ask the user to provide location information, which may include the current location of the user or another location where the user would like to meet mobile vending machine 10. After receiving the user location information, mobile vending machine 10 may automatically maneuver to the location of the user. After mobile vending machine 10 has arrived at the location of the user, the user may use user interface 200 to select and provide payment for a product 20. Then, the user may receive selected product 20 from mobile vending machine 10. Then, the list of products 20 in mobile vending machine 10 may be updated based on the product 20 vended to the user.

During a vending operation according to some embodiments, user mobile device 700 may receive a list of products 20 contained in mobile vending machine 10. Then, the user may use user mobile device 700 to select a product 20. Then, mobile vending machine 10 may be summoned by a user to a location using user mobile device 700. User mobile device 700 may automatically determine the location of the user, or may ask the user to provide location information, which may include the current location of the user or another location where the user would like to meet mobile vending machine 10. After receiving the user location information, mobile vending machine 10 may automatically maneuver to the location of the user. After mobile vending machine 10 has arrived at the location of the user, the user may use user interface 200 to provide payment for product 20. Then, the user may receive selected product 20 from mobile vending machine 10. Then, the list of products 20 in mobile vending machine 10 may be updated based on the product 20 vended to the user.

During a vending operation according to some embodiments, user mobile device 700 may receive a list of products 20 contained in mobile vending machine 10. Then, the user may use user mobile device 700 to select a product 20. Then, mobile vending machine 10 may be summoned by a user to a location using user mobile device 700. User mobile device 700 may automatically determine the location of the user, or may ask the user to provide location information, which may include the current location of the user or another location where the user would like to meet mobile vending machine 10. After receiving the user location information, mobile vending machine 10 may automatically maneuver to the location of the user. After mobile vending machine 10 has arrived at the location of the user, the user may use user mobile device 700 to provide payment for product 20. Then, the user may receive selected product 20 from mobile vending machine 10. Then, the list of products 20 in mobile vending machine 10 may be updated based on the product 20 vended to the user.

During a vending operation according to some embodiments, user mobile device 700 may receive a list of products 20 contained in mobile vending machine 10. Then the user may use user mobile device 700 to select and provide payment for a product 20. Then, mobile vending machine 10 may be summoned by a user to a location using user mobile device 700. User mobile device 700 may automatically determine the location of the user, or may ask the user to provide location information, which may include the current location of the user or another location where the user would like to meet mobile vending machine 10. After receiving the user location information, mobile vending machine 10 may automatically maneuver to the location of the user. After mobile vending machine 10 has arrived at the location of the user, the user may receive selected product 20. Then, the list of products 20 in mobile vending machine 10 may be updated based on the product 20 vended to the user.

During a vending operation according to some embodiments, mobile vending machine 10 may be summoned by a user to a location using user mobile device 700. User mobile device 700 may automatically determine the location of the user, or may ask the user to provide location information, which may include the current location of the user or another location where the user would like to meet mobile vending machine 10. After receiving the user location information, mobile vending machine 10 may automatically maneuver to the location of the user. After mobile vending machine 10 has arrived at the location of the user, product storage door 130 may be unlocked such that the user has access to first and/or second product compartments 110, 120. In some embodiments, before unlocking product compartment door 130, the user may be required to confirm his/her identity, for example, by entering on user interface 200 an access code provided on user mobile device 700. In some embodiments, before unlocking product compartment door 130, scanner 220 may be used to verify the identity of the user. In some embodiments, scanner 220 may read a machine readable item displayed on user mobile device 700. In some embodiments, scanner 220 may use the user's biometric characteristic(s) to authenticate the user's identity. Then, product removal sensor 160 may sense the types and quantities of products 20 removed by the user. Then, the user may provide payment for products 20 using user interface 200 and/or user mobile device 700.

In some embodiments, mobile vending machine may complete transactions without the use of a user mobile device 700. For example, a user may approach mobile vending machine 10. Then, the user may use user interface 200 to select and provide payment for a product 20. Then, the user may receive selected product 20 from mobile vending machine 10. This may be beneficial where a first user is engaging with mobile vending machine 10 and an unaffiliated second user may see the machine and be prompted to transact with the machine.

In some embodiments, a user may be required to log in to an application (e.g., by providing a user name and/or password) on user mobile device 700 before summoning and/or completing a transaction with mobile vending machine 10.

In some embodiments, a user may schedule a future time and location to meet mobile vending machine 10 in order to complete a transaction. In the interim between the present time and the scheduled meeting time, mobile vending machine 10 may continue to travel and perform transactions with other users.

In some embodiments, mobile vending machine 10 may be configured to automatically navigate to and/or wait at or near certain locations based on past sales data. For example, control unit 400, docking control unit 560, and/or administrator device 800 may store sales information such as the time, date, location, and/or types and quantities of products 20 sold, and use the sales information to predict where the mobile vending machine 10 is likely to generate the most revenue. Similarly, past sales information may be used to optimize mobile vending machine's response time after it has been summoned by a user. In some embodiments, mobile vending machine 10 may be configured to find and/or recognize groups of people and then advertise product to them and/or wait near them.

In some embodiments, mobile vending machine 10 may be configured to be summoned to a location by a technician, for example, such that mobile vending machine 10 may be serviced.

Figure 9:
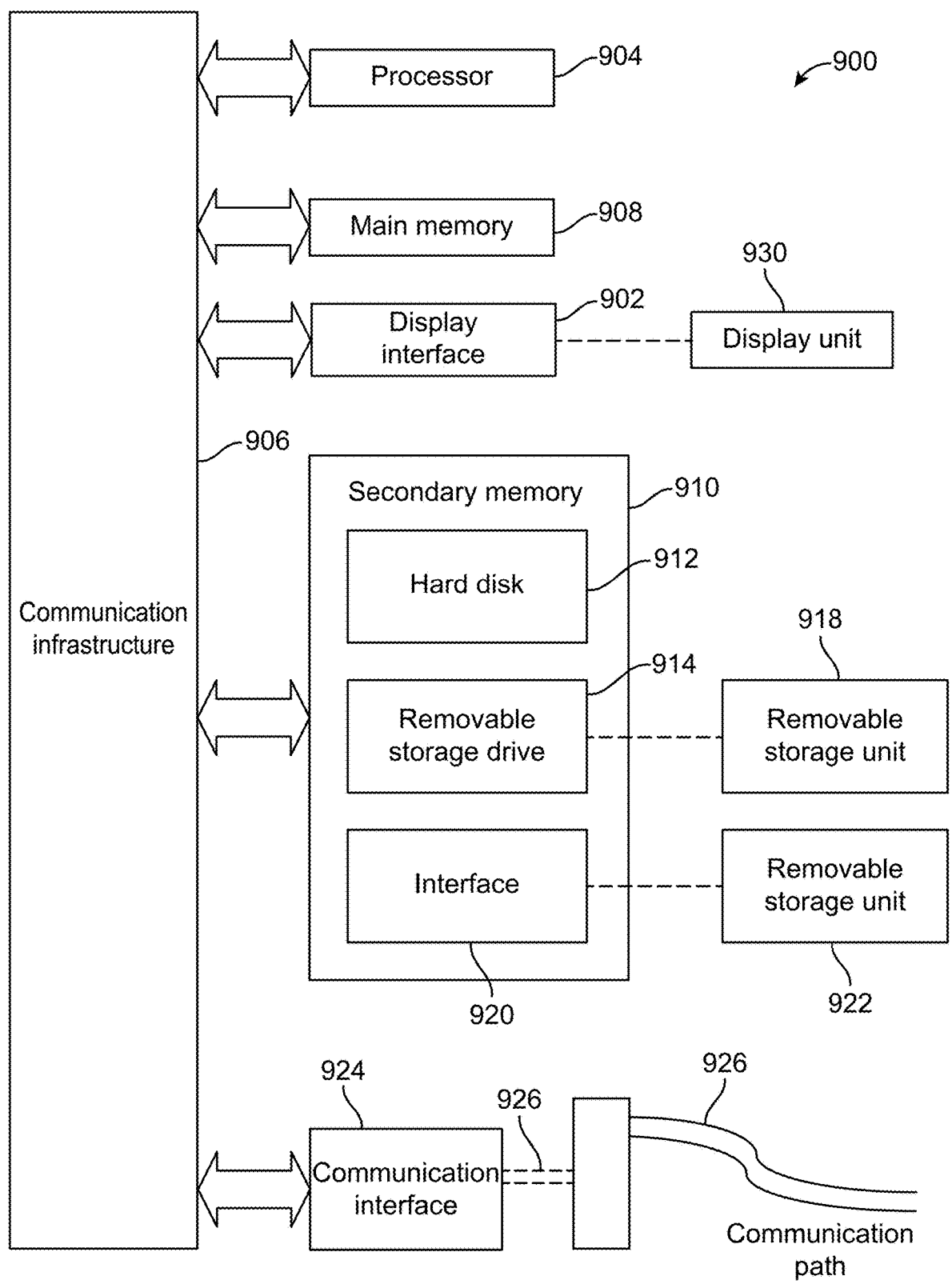
FIG. 9 is a schematic block diagram of an exemplary computer system in which embodiments may be implemented.

FIG. 9 illustrates an exemplary computer system 900 in which embodiments, or portions thereof, may be implemented as computer-readable code. For example, collection of customer data (e.g., biometric data), identification of a customer based on collected data, authentication of customer accounts, and/or tracking of customer accounts may be implemented in computer system 900 using hardware, software, firmware, tangible computer readable media having instructions stored thereon, or a combination thereof and may be implemented in one or more computer systems or other processing systems. Controllers discussed herein may be computer systems having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 900. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A method of vending a product from a mobile vending machine, the method comprising:
   transmitting to a user mobile device a list of products contained in the mobile vending machine;
   receiving from the user mobile device user information including a product selection an identity of the user, and a location, wherein the user is in a different location than the mobile vending machine;
   based on the received user information automatically maneuvering the mobile vending machine to the location;
   verifying the identity of the user after automatically maneuvering the mobile machine to the location; and
   dispensing the product after verifying the identity of the user.

2. The method of claim 1, further comprising:
   updating the list of products contained in the mobile vending machine after dispensing the product.

3. The method of claim 1, wherein the location received from the user mobile device is the location of the user.

4. The method of claim 1, wherein the location received from the user mobile device is a location other than the location of the user.

5. The method of claim 1, wherein the mobile vending machine is configured to operate only within a predetermined geographic area.

6. The method of claim 1, wherein the user mobile device is a smart phone.

7. The method of claim 1, wherein the user information further comprises payment information.

8. A method of vending a product, the method comprising:
   receiving at a user mobile device a list of products contained in a mobile vending machine;
   transmitting user information including an identity of the user and a location of the user mobile device to the mobile vending machine, wherein the mobile vending machine is configured to automatically navigate to the location of the user mobile device;
   verifying the identity of the user at the location; and
   performing a transaction with the user after verifying the identity of the user, wherein the user receives a product from the mobile vending machine.

9. The method of claim 8, further comprising:
   based on the transaction performed with the user updating the list of products contained in the mobile vending machine.

10. The method of claim 8, wherein the transaction includes an electronic payment.

11. The method of claim 8, wherein the user mobile device is a smart phone.

12. An autonomous mobile vending machine, comprising:
   a product compartment for storing one or more products;
   a transceiver, wherein the transceiver is configured to transmit a list of products in the product compartment to a user mobile device and is further configured to receive a product selection from the user mobile device;
   a dispensing opening coupled to the product compartment and accessible by a user to receive a vended product;
   a scanner configured to read a code on the user mobile device to verify an identity of the user; and
   a control unit, wherein the control unit is configured to automatically move the mobile vending machine,
   wherein during a vending operation, the mobile vending machine automatically moves to the location of the user.

13. The autonomous mobile vending machine of claim 12, wherein the autonomous mobile vending machine is configured to operate outdoors.

14. The autonomous mobile vending machine of claim 12, wherein the autonomous mobile vending machine is configured to operate on multiple floors in a building.

15. A method of vending a product from a mobile vending machine, the method comprising:
   transmitting to a user mobile device a list of products contained in a mobile vending machine;
   receiving user information including an identity of the user and a location of the user mobile device at the mobile vending machine, wherein the mobile vending machine is configured to automatically navigate to the location of the user mobile device;
   verifying the identity of the user at the location; and
   performing a transaction with the user after verifying the identity of the user, wherein the user receives a product from the mobile vending machine.

16. The method of claim 15, wherein verifying the identity of the user comprises scanning a code on the user mobile device.

17. The method of claim 15, wherein verifying the identity of the user comprises identifying a biometric characteristic of the user.

18. The method of claim 15, wherein verifying the identity of the user comprises entering an access code on a user interface of the mobile vending machine.

19. The method of claim 15, wherein receiving user information comprises logging into an application on the user mobile device.

20. The method of claim 15, wherein performing a transaction with the user comprises receiving payment from the user and dispensing the product.

* * * * *